United States Patent [19]

Sugimoto et al.

[11] Patent Number: 4,952,774
[45] Date of Patent: Aug. 28, 1990

[54] MOBIL POWER SOURCE FOR PRODUCING WELDING CURRENT FOR AUTOMATIC, SEMI-AUTOMATIC AND MANUAL WELDING

[75] Inventors: Atsushi Sugimoto; Jack C. Marvin, both of Spring, Tex.

[73] Assignee: Chicago Bridge & Iron Technical Service Company, Oak Brook, Ill.

[21] Appl. No.: 323,448

[22] Filed: Mar. 14, 1989

[51] Int. Cl.⁵ .............................................. B23K 9/12
[52] U.S. Cl. ..................................... 219/133; 219/126
[58] Field of Search .................... 219/126, 124.31, 133, 219/130.1; 439/16, 17

[56] References Cited

U.S. PATENT DOCUMENTS

| | | | |
|---|---|---|---|
| 1,933,651 | 11/1933 | Beltz | 439/17 |
| 2,698,891 | 1/1955 | Meyer | 219/126 |
| 2,742,554 | 4/1956 | Westfall | 219/126 |
| 2,763,770 | 9/1956 | Arnold | 219/126 |
| 2,794,901 | 6/1957 | Christensen et al. | 219/126 |
| 2,916,605 | 12/1959 | Lucas | 219/126 |
| 3,210,520 | 10/1965 | Arnold et al. | 219/126 |
| 3,953,121 | 7/1971 | Jones | 219/133 |

OTHER PUBLICATIONS

Converter Power Supplies—More Options for Arc Welding—by Chet Shira—Welding Design & Fabrication, pp. 52-55.

*Primary Examiner*—Clifford C. Shaw
*Attorney, Agent, or Firm*—Marshall, O'Toole, Gerstein, Murray & Bicknell

[57] ABSTRACT

A portable electric power source for movable welding equipment used for constructing storage tanks and the like comprises a platform; an engine mounted on the platform; an AC electric generator mounted on the platform and driven by the engine; a welding machine, mounted on the platform, including electric current inverter and transformer means by which AC electric current from the generator is converted to DC welding current; and current transmission means for conveying the welding current from the welding machine to the welding head of the associated welding equipment. The welding equipment and the power source are mounted on carriages which are coupled together so as to move in unison as the welding operation progresses.

5 Claims, 2 Drawing Sheets

MOBIL POWER SOURCE FOR PRODUCING WELDING CURRENT FOR AUTOMATIC, SEMI-AUTOMATIC AND MANUAL WELDING

This invention relates to welding apparatus and ancillary equipment. More particularly, this invention pertains to a portable electric power source for automatic, semi-automatic and manual welding equipment, especially welding equipment used for field fabrication and construction of storage tanks, vessels and other receptacles.

BACKGROUND OF THE INVENTION

Electric welding is extensively used in the manufacture of a vast array of consumer and industrial metal products. When such products are made in a shop or plant an electrical power source to operate the welding equipment is always readily available. However, electric welding of field erected or constructed products is usually conducted at sites which lack a commercial source of electrical power so that it is necessary to resort to on-site generation of the required electric current by means of portable apparatus. Such apparatus will generally include a hydrocarbon fluid fueled engine to drive an electric generator, a fuel tank, ancillary transformers, controls and electric transmission lines to deliver the D.C. electric current at the proper voltage, amperage and hertz to the welding machines. Such equipment as presently used is both bulky and heavy and is expensive to transport, store and reposition at a construction site. It is also expensive so that if stolen or damaged the loss is substantial.

One substantial use of portable electric current generating apparatus is at construction sites where large vessels, tanks and similar metal shell structures are fabricated. When large cylindrical storage tanks are constructed they are generally made up of rings placed on edge one on top of the other. Each ring is usually made of a series of curved rectangular metal plates positioned end-to-end. When constructed as described, the vertical adjoining ends of the plates must be welded together. Additionally, the girth seams formed by the abutting horizontal edges of the rings must also be welded together. To make the described vertical and horizontal welds a suitable carriage is rollably supported on the top edge of the plates of each ring as it is installed. The carriage supports the required welding machine equipment and welding head. See U.S. Pat. Nos. 2,698,891; 2,742,554; 2,763,770; 2,794,901; and, 3,210,520.

The electric power needed to operate the carriage-supported welding machine equipment is produced on-site by a generator set mounted at ground level. An electric current transmission line extends from the generator set to the carriage. The transmission line must be long enough to accommodate movement of the carriage along the curved tank rings while the generator set is stationary so as to avoid moving the heavy generator set which, in use, weighs about ten tons. As a result, one or more expensive transmission lines, often two hundred and fifty feet long, must be used. The lines are heavy and constitute a serious burden and weight problem when the height of the tank increases as each ring is installed. Additionally, the transmission lines constitute a safety hazard and can be entangled with other construction equipment and be damaged or severed.

From the above it is believed clear that a need exists for an improved and lighter weight portable electric power source, and especially one which makes it unnecessary to use long transmission lines.

SUMMARY OF THE INVENTION

According to the invention a portable electric power source for welding equipment is provided comprising a platform; an engine mounted on the platform; an AC electric generator mounted on the platform and driven by the engine; a welding machine, mounted on the platform, including electric current inverter and transformer means by which AC electric current from the generator is converted to DC welding current; electric power transmission means, from the generator to the welding machine, carried by the platform; a first DC welding current transmission means from the welding machine adapted to be joined to a welding head; and a second DC welding current transmission means from the welding machine adapted to be joined to a grounding means.

According to a further aspect of the invention there is provided a portable electric power source for welding equipment comprising a platform; an engine mounted on the platform; an AC electric generator mounted on the platform and driven by the engine; an inverter welding machine mounted on the platform, with said inverter welding machine being capable of rectifying low hertz AC electric current produced by the generator to DC current, electronically inverting the DC current to higher hertz AC current and transforming the higher hertz AC current to a suitable voltage and then rectifying the AC current to DC welding current; electric power transmission means, from the generator to the inverter welding machine, carried by the platform; a first DC welding current transmission means from the inverter welding machine adapted to be joined to a welding head; and a second DC welding current transmission means from the inverter welding machine adapted to be joined to a grounding means.

Each of the described platforms can be mounted on a carriage means adapted to be supported by a horizontal edge; the carriage means can have a roller adapted to roll on the horizontal edge; and the DC welding current transmission means can be grounded through the roller.

The invention also provides a combination comprising:

A. a first carriage adapted to roll along the top horizontal edges of stationary vertical metal plates; means to drive the first carriage along the horizontal edges; and at least one welding head and ancillary equipment carried by the first carriage for electric arc welding;

B. a portable electric power source for welding comprising a second carriage adapted to roll along the top horizontal edges of stationary vertical metal plates; an engine mounted on the second carriage; an AC electric generator mounted on the second carriage and driven by the engine; a welding machine, mounted on the second carriage, including electric current inverter and transformer means by which AC electric current from the generator is converted to DC welding current; electric power transmission means, from the generator to the welding machine, carried by the second carriage; a first DC welding current transmission means from the welding machine to the welding head on the first carriage; and a second DC welding current transmission means from the welding machine to a grounding means; and C. means coupling the second carriage to the first carriage so that the first and second carriages roll in unison on the metal plates.

DESCRIPTION OF THE DRAWINGS

The invention will be better understood from the detailed description which follows, taken in conjunction with accompanying drawings, in which:

As shown in FIG. 1, the present invention provides a portable electric power source 10 which is adapted to be used together with a movable welding assembly 11 in the construction of large vessels such as cylindrical storage tanks. As shown in FIG. 1, the welding assembly comprises a framework 12 supported on the top horizontal edge 13 of a section of steel plate 14 from which the tank is assembled. Assembly 11 is driven along plate 14 by means of motor 16 which drives one or more rollers 17 supporting the framework. Supported within framework 12 is a welding head 18 situated opposite the joint 19 between adjacent steel plates 14. As welding assembly 12 moves, welding head 18 welds the plates together to produce a weld joint 21 as shown.

Figure 1:
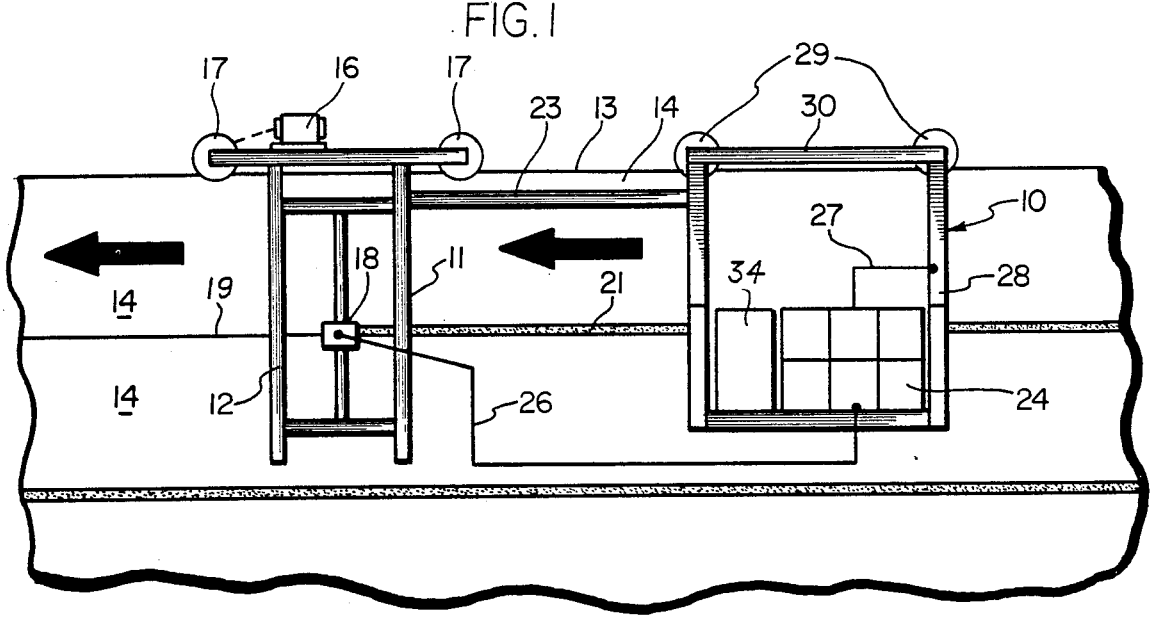
FIG. 1 a schematic representation of a movable welding assembly and a portable electric power source in accordance with the invention suspended on the vertical edge of a tank under construction.

Power for welding assembly 11 is provided by portable electric power source 10 which is mechanically connected by means of bar 23 to welding assembly 11 and is therefore drawn along by the welding assembly as it moves in making the welded joint. A welding machine 24 included in the portable electric power source provides DC welding current through conductor 26 leading to the welding head 18. The ground or return circuit for the welding machine is made by means of second DC current transmission conductor 27 to a frame 28 supporting welding machine 24. Frame 28 is itself rollers 29 and carriage 30 resting on the top horizontal edge of steel plate 14.

Figure 4:
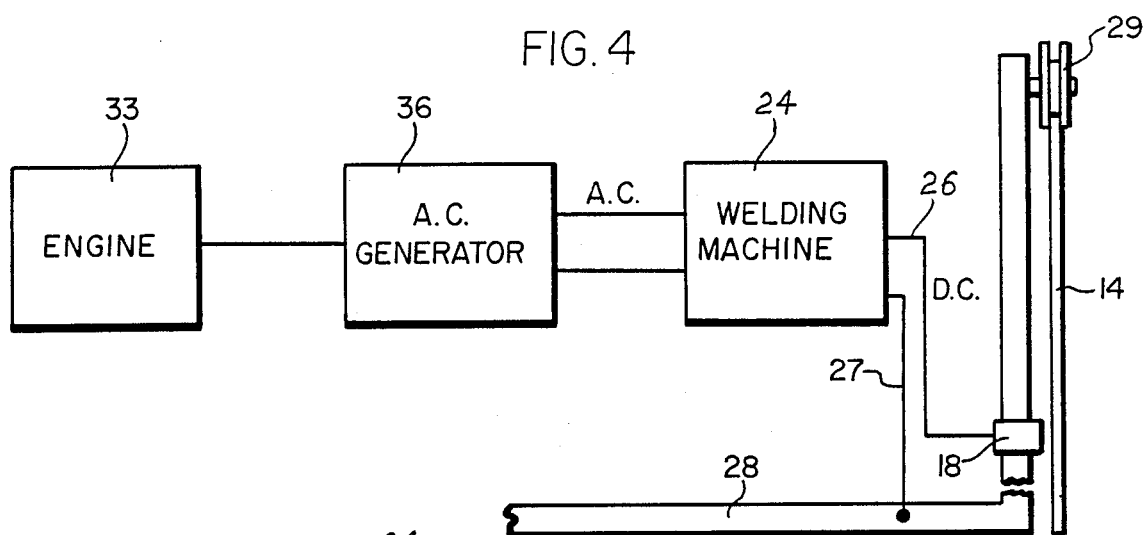
FIG. 4 is a schematic diagram indicating the relationship of the engine, the generator and the welding machine incorporated in the portable electric power source of the invention.
Figure 2:
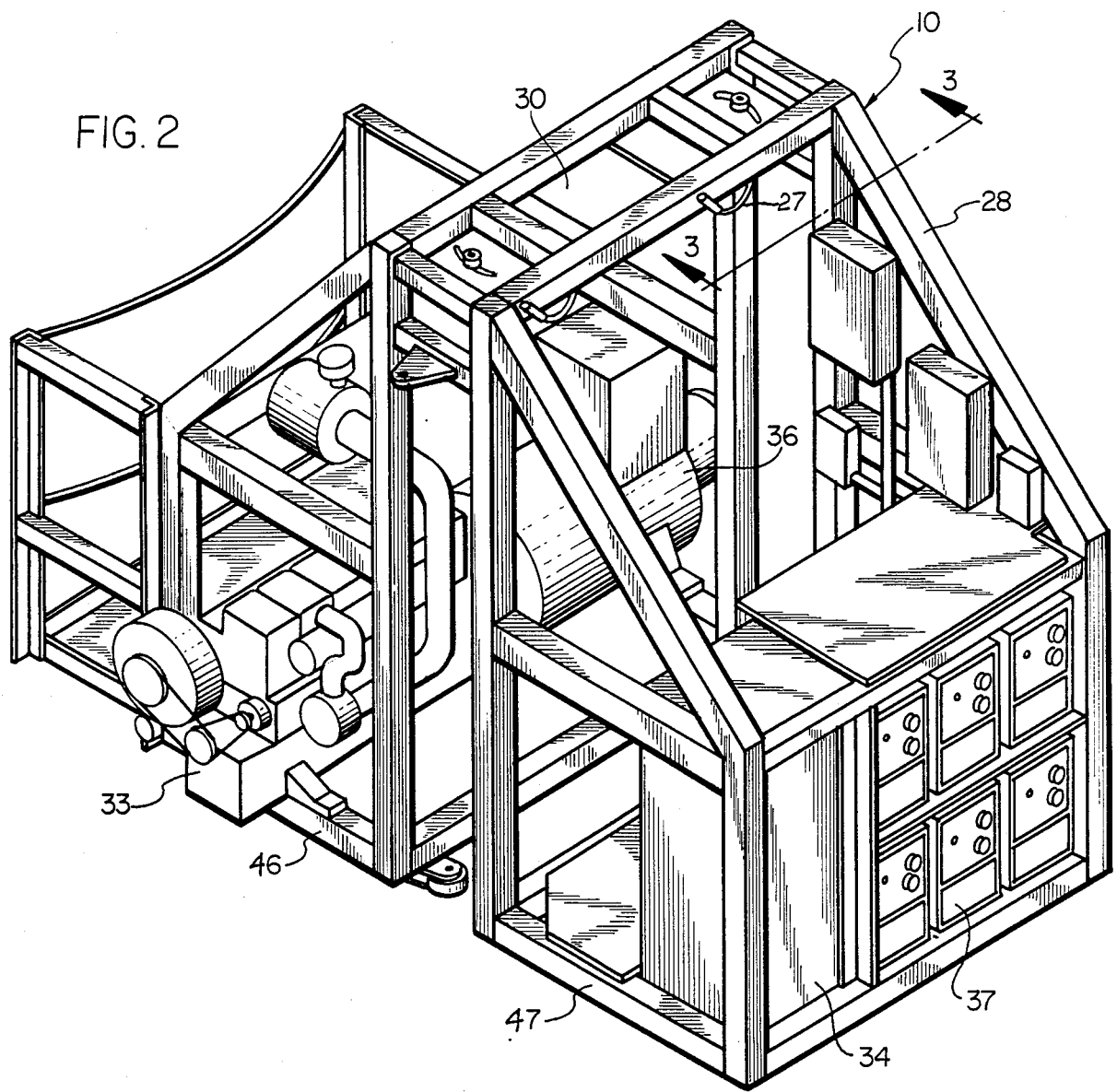
FIG. 2 an isometric view of a portable electric power source in accordance with the invention.
Figure 3:
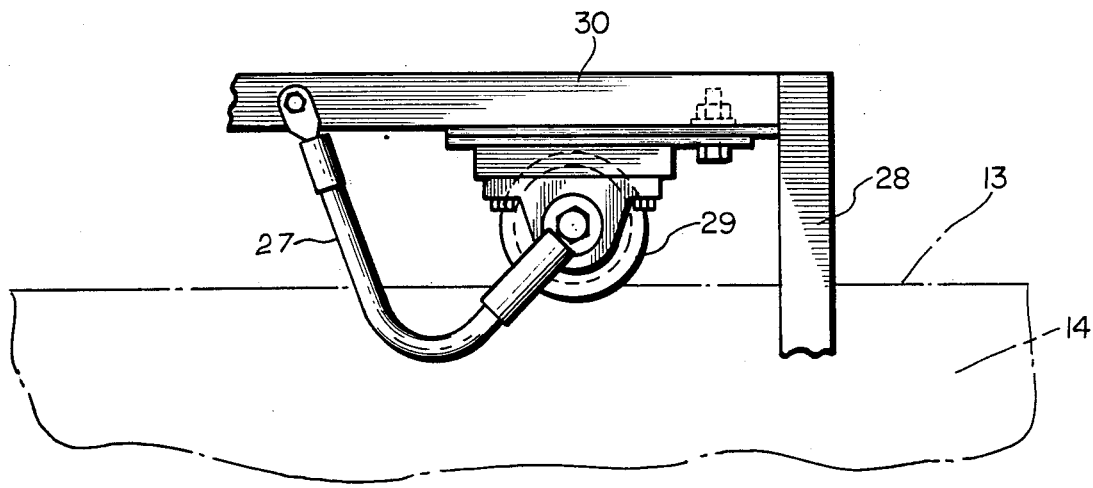
FIG. 3 is a detailed view showing a means for grounding the DC welding current transmission means through a roller on a carriage supporting the power source.

FIG. 2 shows in more detail the construction of the portable electric power source assembly 10 depicted schematically in FIG. 1. Assembly 10 includes two platforms 46, 47 supported from a carriage 30 including two rollers 29 (FIG. 3). Assembly 10 shown in FIG. 2 is suspended from the top edge 13 of vertical metal plate 14, as shown in FIG. 1, with platform 46 on one side of the plate and platform 47 on the other side. Platform 46 holds a suitable internal combustion engine 33, the fuel for which is contained in fuel tank 34. Engine 33 is mechanically coupled to an AC generator 36 which produces an AC voltage which is fed to a welding machine 24. As shown in FIG. 4, the DC output of welding machine 24 is supplied to welding head 18 in welding assembly 11. A return path for the DC welding current is provided through roller 29 and conductor 24, connected to frame 28 of power source 10.

Figure 5:
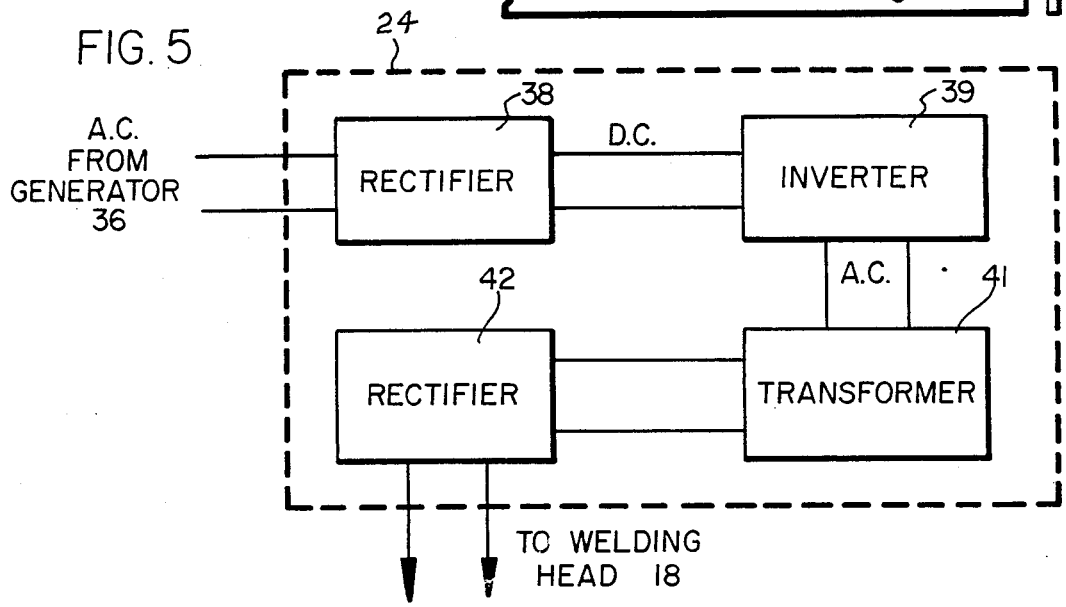
FIG. 5 is a schematic showing the electrical connection among the components of the welding machine used in the invention.

Welding machine 24 used in the invention is suitably an inverter type, the operation of which is shown schematically in FIG. 5. In welding machine 37, AC current from generator 36, typically 60 Hz., is supplied to rectifier 38 to produce DC current which is fed to electronic inverter 39, wherein it is converted into a high frequency AC current, typically 5000 Hz. The high frequency AC current is fed to transformer 41 wherein it is transformed to an appropriate voltage and then rectified in rectifier 42 to the desired DC welding current. Using the system depicted in FIG. 5, the size of transformer 41 can be reduced substantially in the ratio of the two AC currents, e.g. 60/5000 Hz. By using an AC current at 5000 Hz. from inverter 39, the size of transformer 41 can be reduced to a size which is only 1.2% of the size required if a 60 Hz. AC current were fed to the transformer.

The foregoing detailed description has been given for clearness of understanding only, and no unnecessary limitations should be understood therefrom, as modifications will be obvious to those skilled in the art.

We claim:

1. A self-powered, portable electric power source for supplying the electrical power required to operate welding equipment used in joining vertical plates along horizontal and vertical joints, comprising:

a platform adapted for driven movement adjacent said vertical plates and on and along a top horizontal edge of said plates;

an engine mounted on the platform including a fuel supply for operating the engine;

an AC electric generator mounted on the platform and driven by the engine;

a welding machine, mounted on the platform, including electric current inverter and transformer means by which AC electric current from the generator is converted to DC welding current;

electric power transmission means, from the generator to the welding machine, carried by the platform;

a first DC welding current transmission means from the welding machine adapted to be joined to a welding head;

a second DC welding current transmission means from the welding machine adapted to be joined to a grounding means; and motor means coupled to drivingly move the platform on and along said top horizontal edge, including an electric motor electrically powered by the electric current supplied from the AC electric generator.

2. A self-powered, portable electric power source according to claim 1 in which:

the platform is mounted on a carriage means adapted to be supported by said top horizontal plate edge;

the carriage means has a roller adapted to roll on the top horizontal edge;

the second DC welding current transmission means is grounded through the roller; and the engine is an internal combustion engine driving said AC electric generator and powering said electric motor.

3. A combination for welding the horizontal and vertical joints of stationary vertical metal plates comprising:

A. a first carriage including means to roll along the top horizontal edges of said stationary vertical metal plates; motor means to drive the first carriage along the horizontal edges; and at least one welding head and ancillary equipment carried by the first carriage for electric arc welding;

B. a self-powered, portable electric power source for welding comprising:

a second carriage including means to roll along the same top horizontal edges of said stationary vertical metal plates in tandem with said first carriage;

an engine mounted on the second carriage, including a fuel supply for operating the engine;

an AC electric generator mounted on the second carriage and driven by the engine; a welding machine, mounted on the second carriage, including electric current inverter and transformer means by which AC electric current from the generator is converted to DC welding current;

electric power transmission means, from the generator to the welding machine, carried by the second carriage;

a first DC welding current transmission means from the welding machine adapted to be joined to the welding head on the first carriage; and a second DC welding current transmission means from the welding machine adapted to be joined to a grounding means; and C. means mechanically coupling the second carriage to the first carriage for driving the second carriage in tandem tow with respect to the first carriage so that the first and second carriages roll in unison on the same horizontal edges of said stationary vertical metal plates.

4. A combination according to claim 3 in which:

the second DC welding current transmission means is grounded through a roller on the second carriage;

the motor means includes an electric motor electrically powered by the current supplied from the AC electric generator; and the engine is an internal combustion engine.

5. A self-contained, self-powered, portable electric power source for supplying the electrical power required to operate welding equipment used in joining vertical plates along horizontal joints, comprising:

a platform including means for driven movement of said platform adjacent said vertical plates and on and along a top horizontal edge of said plates;

an internal combustion engine mounted on the platform;

a fuel tank mounted on the platform for containing a fuel supply to be coupled to the engine for operation thereof;

an AC electric generator mounted on the platform and driven by the engine;

a welding machine, mounted on the platform, including electric current inverter and transformer means by which AC electric current from the generator is converted to DC welding current;

electric power transmission means, from the generator to the welding machine, carried by the platform;

a first DC welding current transmission means from the welding machine adapted to be joined to a welding head;

a second DC welding current transmission means from the welding machine adapted to be joined to a grounding means; and a framework extending upwardly from the platform and substantially enclosing the engine, fuel tank, AC electric generator, welding machine, electric power transmission means, and first and second DC welding current transmission means substantially within the interior confines of said framework.

* * * * *

UNITED STATES PATENT AND TRADEMARK OFFICE
CERTIFICATE OF CORRECTION

PATENT NO. : 4,952,774

DATED : August 28, 1990

INVENTOR(S) : Atsushi Sugimoto, etal

It is certified that error appears in the above-identified patent and that said Letters Patent is hereby corrected as shown below:

Column 3, line 52, "itself rollers 29" should read --itself supported by rollers 29--.

Column 5, line 1, after "metal plates;" begin new paragraph with --motor means to drive--.

Column 5, line 2, after "horizontal edges; and" begin new paragraph with --at least one--.

Signed and Sealed this

Twenty-eighth Day of January, 1992

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO.   : 4,952,774

DATED        : Aug. 28, 1990

INVENTOR(S)  : Atsushi Sugimoto and Jack C. Marvin

It is certified that error appears in the above-identified patent and that said Letters Patent is hereby corrected as shown below:

Col. 4, line 1,         change "conductor 24" to --conductor 27--.

Col. 4, line 5,         change "welding machine 37" to --welding machine 24--.

Signed and Sealed this

Nineteenth Day of May, 1992

Attest:

DOUGLAS B. COMER

Attesting Officer         Acting Commissioner of Patents and Trademarks